(12) United States Patent
Sánchez et al.

(10) Patent No.: US 11,992,830 B2
(45) Date of Patent: May 28, 2024

(54) PROCESS FOR THE ACTIVATION AND START-UP OF CATALYSTS FOR DEEP HYDRODESULFURIZATION OF MIDDLE DISTILLATES

(71) Applicant: Instituto Mexicano del Petróleo, Mexico City (MX)

(72) Inventors: Gustavo Jesús Marroquín Sánchez, Mexico City (MX); Pedro Martin Vega Merino, Mexico City (MX); Carlos Cureño Rodríguez, Mexico City (MX); Patricia Rayo Mayoral, Mexico City (MX); Salvador Castillo Cervantes, Mexico City (MX); José Antonio Toledo Antonio, Mexico City (MX); Jorge Ancheyta Juárez, Mexico City (MX); Magally Cruz Juárez, Mexico City (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 0 days.

(21) Appl. No.: 18/128,919

(22) Filed: Mar. 30, 2023

(65) Prior Publication Data
US 2023/0347332 A1 Nov. 2, 2023

(30) Foreign Application Priority Data
Mar. 31, 2022 (MX) .................... MX/a/2022/003972

(51) Int. Cl.
*B01J 37/08* (2006.01)
*C10G 45/22* (2006.01)

(52) U.S. Cl.
CPC .............. *B01J 37/08* (2013.01); *C10G 45/22* (2013.01); *B01J 2203/00* (2013.01); *C10G 2300/1048* (2013.01); *C10G 2300/703* (2013.01)

(58) Field of Classification Search
CPC ....... B01J 37/08; B01J 2203/00; C10G 45/22; C10G 2300/1048; C10G 2300/703
See application file for complete search history.

(56) References Cited

U.S. PATENT DOCUMENTS

2014/0353213 A1* 12/2014 Smegal ................ B01J 31/0204
502/313

FOREIGN PATENT DOCUMENTS

KR 20050090007 A * 9/2005

OTHER PUBLICATIONS

Cholley et al. (KR20050090007A; Sep. 2005) Translation (Year: 2005).*

\* cited by examiner

*Primary Examiner* — Ellen M McAvoy
*Assistant Examiner* — Chantel Graham
(74) *Attorney, Agent, or Firm* — FisherBroyles, LLP; Jason P. Mueller (57) ABSTRACT

The present invention deals with activation and start-up procedures of catalysts for the deep HDS of middle distillates for producing ultra low sulfur diesel (ULSD), consisting of two in situ activation stages: at stage 1, TGA is applied, and at stage 2, DMDS is used; kerosene is the transport means at these stages, which are carried out under given temperature and pressure conditions, and feedstock and hydrogen flows at established times. After the activation of the catalyst in situ, the stabilization stage takes place under selected temperature and pressure conditions, feedstock and hydrogen flow at established times, with which the (Continued)

stabilization of the highly dispersed metallic sulfides is achieved and, in this way, the activity of the catalysts removing contaminants for the production of ULSD is increased.

25 Claims, 2 Drawing Sheets

PROCESS FOR THE ACTIVATION AND START-UP OF CATALYSTS FOR DEEP HYDRODESULFURIZATION OF MIDDLE DISTILLATES

CROSS REFERENCE TO RELATED APPLICATIONS

The present application claims priority of Mexican patent application number MX/a/2022/003972 filed Mar. 31, 2022.

TECHNICAL FIELD OF THE INVENTION

This invention can be considered within the field of the start-up and activation of catalysts for the deep hydrodesulfurization (HDS) of middle distillates for producing ultra low sulfur diesel (ULSD).

BACKGROUND OF THE INVENTION

Based on the new world environmental normativity and legislation, which become stricter every time regarding exhaust emissions, it is necessary that sulfur content in fossil fuels be diminished, and in this case, diesel. Recently, the demand of this fuel has increased and in contrast, the light crude reserves have diminished, which means that there is higher availability of heavy crude oil and the compelling exploitation need.

Heavy crude oil presents a high index of contaminants such as sulfur, nitrogen, asphaltenes, carbon, and metals (Ni and V). This fact has encouraged the joint development of both new and improved deep hydrodesulfurization processes and their corresponding catalysts. In recent studies, the fundamental role played by catalysts to achieve higher activity in the production of diesel with lower sulfur content has been emphasized. At world level, the sulfur content in diesel is found between 10 and 15 wppm and is regulated by the European Union, the United States of America, and several Asian countries.

The catalytic HDS process is employed to reduce the sulfur content in the different oil fractions using hydrogen and a catalyst under specific pressure and temperature conditions. These reaction conditions allow the removal of sulfur from the organic compounds, transforming it into $H_2S$, which is transformed into elemental sulfur in a further process.

The development of new catalysts is intended to increase the removal efficiency of sulfur in diesel. As part of the continuous enhancement of new HDS catalysts, the incorporation of organic additives during their synthesis is found, for organic molecules improve the dispersion of the active phase (active metals) and the metal/support interaction.

In most patents describing HDS catalysts, two main factors have been considered to achieve ultra low sulfur levels: the metal/support interaction and the catalyst activation and start-up stages. As for the deep HDS catalysts for producing diesel, in general, patents have reported on the use of metals from the VIB and VII groups in the periodic table supported on gamma alumina. Other patents have included metals from the IA, IIA, VA, VIIA, IIB, IVB, VB and VIIB groups on supports such as alumina, zeolites, silicon, silicon-alumina, titanium, zirconium and their combinations.

The present invention refers to the activation and start-up stages of deep HDS catalysts for middle distillates, both fresh and regenerated, for producing ultra low sulfur diesel (ULSD) by means of the in situ application of an organic additive (chelating agent) and a sulfhydration agent, employing a hydrocarbon effluent to incorporate them to the catalyst under specific temperature and pressure conditions.

The addition of sulfur compounds to HDS catalysts has been studied for the last four decades; it started with additives or organic molecules containing sulfur in order to activate the catalysts, where an example is the use of alkyl polysulfides. Afterward, free-of-sulfur organic molecules (chelating agents) were studied in the preparation of catalysts as their promoters in their oxidized phase. The application of these organic molecules was divided into two types: chelating additives, which originate the complexation of metallic ions and the non-chelating ones; likewise, the difference between the molecules containing sulfur and those without was established.

Among the additives containing sulfur, thioglycolic acid (TGA) and di-tert-thionylpentasulfide (TNPS) are found and are used in the activation of HDS catalysts by means of hydrogen treatment at temperatures ranging from 100 to 350° C. and within a pressure interval from 20 to 40 kg/cm². Additionally to TGA and TNPS, there are other chelating agents like the ethylenediaminetetraacetic acid (EDTA) and nitrilotriacetic acid (NTA). In this context, the formation of stable complexes featuring TGA and transition metals has been found.

As for the additives containing sulfur, like TGA and TNPS, it is said that they have a double function, combining the effect of organic additives without sulfur with those having a sulfhydration action. The last ones include the role of S—O exchange during the thermal treatment. The chemical effects exerted by these additives are of morphological type.

The formation of stable TGA complexes with transition metals has been the subject matter of various studies, where it has been found that the sulfur carrying molecules are decomposed, producing residual carbon. This residual carbon, present in the active sulfide phase generated from organic sulfur precursors, improves the properties of HDS catalysts through the stabilization of highly dispersed sulfides as a morphological action.

In an activation study of a HDS catalyst, the use of TNPS was compared with ex situ presulfhydration with $H_2S$ and it was observed that by using TNPS, higher HDS activity was achieved due to higher dispersion of the presulfhydrated active phase. Additionally, by XPS analysis, a strong interaction between TNPS and the catalyst support was revealed, which was based on the partial reduction of molybdenum ions after the thermal treatment with hydrogen, where TNPS decomposed within the interval ranging from 160 to 220° C., transforming the initial Mo (VI) oxide into $MoS_2$. Likewise, it was also found that the activation of the active phase and its dispersion increased with the hydrogen partial pressure.

In another study, a commercial $CoMo/Al_2O_3$ catalyst was presulfhydrated with different agents and its activity was evaluated in the HDS of dibenzothiophene (DBT). The catalyst presulfhydrated with polysulfide showed higher or equal activity to that obtained when dimethyl disulfide (DMDS) and carbon disulfide ($CS_2$) were used as sulfhydration agents. Further studies showed that the effects of additives with organic sulfur and solvents, if identical conditions are used, generate a significant difference in the activity of HDS catalysts. In fact, in the industrial practice, the benefit of employing sulfhydration agents is not only associated with their chemical effect, but also with their "thermal well" effect, where these sulfhydration agents absorb the heat released during the transformation of the oxide to metallic sulfide, with which better dispersion of the active phase is achieved. As a matter of fact, polysulfides are similar in their chemical nature to that of DMDS, although the latter is considered more as a sulfhydration agent than as an organic additive.

To TGA, as chelating agent, the formation of the Mo (V) complex is attributed, from the Mo (VI) ion, where it is considered that it works as a reducing ligand. The chelating properties of TGA set it as a compound that allows the transport of active metallic species, especially with transition metals. TGA is used in the ex situ activation of CoMo/Al$_2$O$_3$ catalysts and its role with different TGA/Mo ratios has been studied in order to make the most of its properties as chelating compound and sulfhydration agent to increase the sulfurization degree of the active metals and the simultaneous sulfurization of Mo and Co, which leads to the shortening of the MoS$_2$ sheets and to the increase in the number of Mo atoms at a given arrangement position.

In the case of the NiMo catalysts, also ex situ TGA treatments have been performed with TGA/Mo molar ratios equal to 4. In tests with 1-benzothiophene and thiophene, higher catalytic activity was observed. Likewise, a Mo supported on alumina catalyst with metallic loading of 14 wt. % of different metal precursors was treated with TGA with a TGA/Mo molar ratio of 1. The different saturated phases were analyzed by XPS and HRTEM-STEM and it was observed that the charge transfer from the ligand to metal (LMCT) between the TGA and Mo atoms led to the formation of reduced Mo$_5^+$ species, thus concluding that with the incorporation of TGA, better dispersion of MoO$_3$ crystals was achieved and resulting in metallic sulfide particles with higher stacking of MoS$_2$ sheets. Furthermore, in HDS tests of DBT, high catalytic activity due to the growth of Type II active sites was observed.

Complementarily, the strong effect exerted by TGA on the phases of metallic oxides (Mo, Ni, Co) can be established, which is observed in the formation of active species, chemically different before the thermal activation and in some cases, until their reactivation.

According to the state of the art, organic additives play a major role in the catalytic activity of the HDS catalysts; such role has been referred to as "potentiating effect" and depends on the application stage. The most common case occurs during the catalyst preparation stage, where the main effects are reflected in:

Complexation of metallic ions (chelating effect)
Metal-support interaction
Activation delay
Viscosity change of the impregnating solution
The modification of these properties affects in turn the:
Metallic dispersion
Size and arrangement of active metallic particles
Activation degree The synergy of these modifications confers the catalyst the most important catalytic property: an increasing number of promoted active sites.

At first, organic additives exerted a strong impact on the synthesis of HDS catalysts, in ex situ treatments with sulfhydration agents for increasing their activity. However, the evaluation of these treatments is currently focused not only on improving the catalytic activity, but also on the rejuvenation of HDS catalysts for their reuse with good performance. The most recent practice consists in activating in situ the HDS catalysts with one or various organic addictives in order to improve their catalytic properties, especially the sulfur removing capacity.

The U.S. Pat. No. 6,635,596 B1 (2003) deals with the use of an organic additive in the regeneration of a HDS catalyst with a group VIB metal and other of the VIII group supported on gamma alumina. The catalyst contains, at least, one group component featuring, at least, two hydroxyl groups, from 2 to 10 carbon atoms and polyethers belonging to this group. The regeneration of the HDS catalyst is carried out with an oxygen current, at temperatures from 300 to 500° C., pressure from 5 to 200 kg/cm$^2$, space velocity from 1 to 4 h$^{-1}$ and hydrogen/hydrocarbon (H$_2$/oil) ratio from 50 to 200 NL/L. The following compounds are included as example additives: citric acid, oxalic acid, malonic acid, maleic acid, butenediol, aldehydes and glycols and aldols. Likewise, these compounds are proposed: ethylenediaminetetraacetic acid (EDTA), hydroxyethylenediamino-triacetic acid (HEDTA) and diethylenetriaminepentaacetic acid (DTPA). The regeneration of the HDS catalysts with the organic additives is carried out within the interval from 0.25 to 24 h. The exhausted catalysts contain between 5 and 20 wt. % of sulfur and the regenerated catalysts have less than 1 wt. % of sulfur. The benefit stems from the fact that the catalysts regenerated by this invention present activity that is higher than that displayed by those with an additive.

The U.S. Pat. No. 8,278,234 B2 (2012) describes a regeneration process of catalysts for the HDS of hydrocarbons, where the invention subject matter is based on the fact that these catalysts should possess, at least, a metal from group VIII and at least one from group VIB and deposited on a refractory support. The regeneration consists of at least one thermal treatment of the catalyst in the presence of oxygen at temperatures from 350 to 550° C. and at least, a second stage for adding one or more additives to the catalyst. The regeneration process in this patent is focused on HDS catalysts and the aim of adding organic additives is their rejuvenation to recover their initial activity. For the rejuvenation of the catalysts, an organic molecule from 1 to 30 carbon atoms is proposed, which optionally can feature heteroatoms like oxygen and nitrogen, with saturated or unsaturated molecules. The goal of this invention is that with this additive, the chelating effect of the active metals be generated, i.e. the activation of active sties by means of the transformation of metallic oxides into metallic sulfides.

U.S. Pat. No. 8,377,839 B2 (2013) deals with a regeneration process of catalysts for the HDS of hydrocarbons, where the invention subject is based on the fact that these catalysts should have, at least, one metal from group VIII and at least one from group VIB and be deposited on a refractory support. The regeneration considers, at least, a thermal treatment stage of the catalyst in the presence of oxygen at temperature from 350 to 550° C. and at least, a second stage considering the addition of one or more additives to the catalyst surface. For the rejuvenation of the catalysts, an organic molecule from 1 to 30 carbon atoms, without aromatic rings and that optionally can feature heteroatoms like oxygen and nitrogen, with saturated or unsaturated molecules. The regeneration process proposed by this invention restores a high catalytic activity level with an easy-to-use and non-toxic organic additive.

The Mexican patent 274444 (2005) describes a HDS catalyst for residues and heavy crude, where the current to be treated contains sulfur and nitrogen compounds, metals (nickel and vanadium) and asphaltene material. The employed catalyst is of the NiMo type with percentages from 8 to 12 wt. % of molybdenum and from 2 to 6 wt. % of nickel, supported on mixed oxides based on TiO$_2$/Al$_2$O$_3$ and TiO$_2$—Al$_2$O$_3$. The presulfhydration stage was carried out with reagent grade DMDS (97%), using desulfurated diesel at a temperature of 320° C., pressure of 28 kg/cm$^2$, liquid hourly space velocity (LHSV) of 2.0 h$^{-1}$ and a H$_2$/oil ratio of 56.6 m³/bbl. The evaluation of the catalytic activity of three catalysts (A3, B1 and C1) in a fixed-bed reactor with ascending flow at pilot plant level was carried out at 400° C., pressure of 70 kg/cm², LHSV of 1.0 h$^{-1}$ and H$_2$/oil ratio of 141.6 m³/bbl. The following HDS activities were reported: A3) start-up, 81.6% (6 h)–47% (36 h) until 120 h; B1) start-up, 63% (6 h)–47% (36 h) until 120 h; C1) start-up, 82.9% (6 h)–59% (36 h) until 120 h.

The previous technologies are surpassed by the present invention, for in none of them, the activation and start-up of HDS catalysts with a couple of organic agents with two stages for increasing the catalytic activity under typical industrial plant operating conditions were carried out.

This invention provides an improved process for the in situ activation and start-up of either a fresh or rejuvenated HDS catalyst for the deep hydrodesulfurization of middle distillates, which increases their catalytic activity for the production of ultra low sulfur diesel (ULSD).

This invention offers an activation and start-up through a first stage, where a chelating organic additive is used and a second stage with a sulfur organic agent through a given sequence of times and temperature, pressure, and space velocity conditions in order to increase their catalytic activity for producing ULSD.

This invention provides activation and start-up procedures, combining a first stage with a chelating organic additive and a second stage with a sulfur organic agent with the concentrations of each compound.

Another characteristic that distinguishes this invention is the use of a hydrocarbon current for transporting the chelating and sulfhydration agents, in both stages, with their corresponding concentrations.

Likewise, in the present invention, the addition of the organic additive and sulfhydration agent is carried out in the plant reactor with a sequence given in times and temperature, pressure and space velocity conditions, followed by the feedstock to be hydrotreated by the HDS process.

Finally, this invention is also different from others in the sense that in these activation and start-up procedures with both stages adding an organic additive and a sulfhydration agent with a given sequence of time and temperature, pressure and space velocity conditions not only increase the catalytic activity for the production of ULSD, but also increase the activity of rejuvenated catalysts.

BRIEF DESCRIPTION OF THE INVENTION DRAWINGS

DETAILED DESCRIPTION OF THE INVENTION

This invention is related to activation and start-up procedures of catalysts for the deep hydrodesulfurization of middle distillates through two stages: the first stage refers to the use of a chelating organic additive consisting of TGA and kerosene or straight run gas oil (SRGO) as transport means and the second stage describes the use of a sulfhydration agent consisting of DMDS and kerosene or SRGO as transport means with a sequence given in times and temperature, pressure and space velocity conditions and feedstock type established for each process run with their corresponding efficiencies in the deep hydrodesulfurization of middle distillates regarding the sulfur content in the produced diesel.

In the present invention, as part of the first stage, the use in situ of an organic additive (TGA), whose main characteristic is its chelating effect or complexation of active metals for the stabilization of highly dispersed metallic sulfides, is proposed. The TGA effect complexing Mo allows the transport of reduced Mo$^{+5}$ active metallic species.

Another important TGA effect is that the TGA/Mo ratio conditions the chelating effects, which in combination with the organic sulfhydration additive (DMDS) increases the sulfhydration effect of the active metal, i.e. in addition to reduce the length of the MoS$_2$ sheets, higher catalytic activity of the HDS catalysts reducing the content of sulfur in diesel is generated.

Furthermore, TGA produces the in situ redispersion of active metallic sites, which are formed during the start-up thermal treatments, producing a HDS catalyst with higher catalytic activity and then, with higher activity in the deep hydrodesulfurization to obtain ULSD.

In a second stage, DMDS is used as sulfhydration agent, where one of its most important in situ effects is the absorption of heat released during the exothermal transformation of oxides into metallic sulfides, generating higher dispersion of the active species and higher activity in the deep HDS.

In order to better understand the activation and start-up of a deep HDS catalyst and the use in two stages, first of TGA as chelating organic additive and second of DMDS as a sulfhydration agent, it is divided into the following steps for the case of a pilot plant with a reactor loaded with 75 mL of catalyst:

I) Catalyst loading
II) Conditioning and hermeticity tests
III) Catalyst drying
IV) First activation stage
V) Second activation stage
VI) Catalyst start-up
VII) Activity tests Step I) It consists in the loading of the catalyst or combined bed of catalysts based on the established loading diagram. This diagram specifies: the catalyst(s) and inert material(s) to be loaded, their location in the reactor, corresponding amounts, heights and estimated value(s) of loaded density/densities.

Step II) It consists in the conditioning of the reactor with the loaded catalyst at ambient temperature for the hermeticity test, which is carried out at a preferred pressure from 70 a 75 kg/cm² and hydrogen flow preferably from 45 a 75 L/h for a period of time preferably from 2 a 4 h. Once the plant hermeticity has been fully confirmed, the pressure (45-60 kg/cm²) and hydrogen flow rate (45-75 L/h) are established before starting to increase the reactor temperature to 120° C. at a heating rate of 20-30° C./h.

Step III) Consists in the drying of the catalyst loaded in the reactor at 120° C. under the same pressure and hydrogen flow rate conditions mentioned in Step II for 2-4 h. Once this time is completed, the reactor inlet temperature is increased from 120 to 230° C. at a heating rate of 20-30° C./h, keeping constant pressure and hydrogen flow rate.

Step IV) Consists of a first activation stage at which a mixture consisting of TGA with kerosene or diesel is added at a preferable flow rate from 170 to 190 mL/h for a preferable time from 4 to 10 h, at preferable temperature from 200 to 230° C., preferable pressure from 45 to 60 kg/cm² and a preferable H₂/oil ratio from 50 to 60 m³/bbl.
Step V) Consists of a second activation stage at which a mixture consisting of DMDS with kerosene or diesel is added at a preferable flow rate from 170 a 190 mL/h, at preferable temperature from 200-230° C., at preferable pressure from 45-60 kg/cm² with preferable H₂/oil ratio from 50-60 m³/bbl and preferable time from 8-16 h. Afterward, the temperature is preferably increased from 240-260° C. with a heating rate from 20-30° C./h under the same just established flow, pressure, H₂/oil ratio and time conditions. During this second stage, the temperature continues being increased preferably from 260-280° C. with the same heating rate and same flow rate, pressure, H₂/oil ratio and time conditions. The second activation stage continues increasing the temperature, now at preferable temperature from 280-300° C. with the same heating rate and same flow, pressure, H₂/oil ratio and time conditions. The last part of the second activation stage occurs by increasing the temperature preferably from 300-320° C. with the same heating rate and same flow, pressure, H₂/oil ratio, and time conditions.
Step VI) Consists in the catalyst stabilization and the treatment is just with kerosene or diesel, with preferable flow rate from 170 to 190 mL/h, under the same pressure and H₂/oil ratio conditions mentioned in Step V, at preferable temperature from 300-320° C. for a preferable time from 48 to 72 h. During this time period, the feedstock to be processed, whose characteristics should be within the interval of middle distillate mixtures (see Table 1), is made ready. Once the established time has passed, the temperature is increased to the value estimated as start of run temperature preferably from 300-320 until 335-355° C. with a heating rate from 5-10° C./h.
Step VII) Consists in performing the activity tests of the improved process in the deep HDS for producing ULSD with the following sequence:
  Activation and start-up conditions
  Selection of feedstock type (Table 1)
  Operating conditions: Temperature, pressure, H₂/oil ratio and LHSV
  Type of deep HDS catalyst (Table 2)

Table 1 shows the physical and chemical characteristics of the processed feedstocks once the improved activation and run process was applied to the catalysts to be evaluated and that are used in the examples developed and shown in this patent.

TABLE 1

Physical and chemical properties of the feedstocks (C)

| Properties | | CI | CII | CIII | CIV |
|---|---|---|---|---|---|
| Sulfur content (wt. %) | | 1.137 | 0.740 | 1.129 | 0.998 |
| Nitrogen content (wppm) | | 118.1 | 78.1 | 120.0 | 126.0 |
| Bromine number (g Br/100 g) | | 3.69 | 2.29 | 1.32 | 4.34 |
| Aromatics content (wt. %) | | 27.1 | 25.9 | 28.7 | 27.6 |
| Density at 20° C. (g/mL) | | 0.8208 | 0.8243 | 0.8394 | 0.8358 |
| Cetane index | | 48.97 | 50.94 | 51.90 | 52.30 |
| Distillation (vol. %) (° C.) | IBP | 150.2 | 159.6 | 192.7 | 171.1 |
| | 10 | 181.9 | 195.5 | 243.5 | 207.7 |
| | 30 | 206.1 | 219.6 | 263.1 | 243.8 |
| | 50 | 238.2 | 247.4 | 277.8 | 275.6 |
| | 70 | 273.9 | 278.3 | 294.5 | 303.3 |
| | 90 | 311.9 | 320.1 | 316.0 | 338.4 |
| | EBP | 335.8 | 353.6 | 336.2 | 365.8 |

Table 2 includes the properties of the catalysts before being loaded in the reactor and that were tested in the pilot plant. Evident differences are observed in the surface area, content, and concentration of the active metals: CATI (LM) and CATII (HM) of NiMo and CATIII of CoMo.

TABLE 2

Properties of the catalysts (CAT)

| | Catalysts | | |
|---|---|---|---|
| Property | CATI (LM) | CATII (HM) | CATIII |
| Specific surface area (m²/g) | 208 | 64 | 30 |
| Pore volume (cm³/g) | 0.53 | 0.10 | 0.00 |
| Average pore diameter (nm) | 10-25 | 5.4 | 5.8 |
| Mo (wt. %) | 9.71 | 18.17 | 15.65 |
| Ni (wt. %) | 2.25 | 4.38 | 0.02 |
| Co (wt. %) | | 0.7 | 3.64 |
| P (wt. %) | 1.04 | 3.13 | 0.4 |
| Al balance (wt. %) | 41.61 | 22.88 | 27.43 |
| Size crushing strength (lbf/mm) | 3.76 | 6.28 | 3.98 |
| Diameter size (mm) | 1-3 | 1-3 | 1-3 |
| Shape | Extrudate | Extrudate | Extrudate |

Table 3 shows the sulfur content values after applying the improved activation and start-up procedures as evidence of the activity of the catalysts in the deep HDS for producing ULSD.

TABLE 3

Catalytic activity after applying the improved activation and start-up procedures in the deep HDS for producing ULSD

| | | CI feedstock | | | | |
|---|---|---|---|---|---|---|
| Tests | Catalyst | Temperature (° C.) | Pressure (kg/cm²) | H₂/oil ratio (m³/bbl) | LHSV (h⁻¹) | S (wppm) |
| 1 | | Characteristics | | | | |
| 2 | CATI(LM) | 335 | 54 | 60 | 1.6 | 18.9 |
| 3 | | 345 | 54 | 60 | 1.6 | 2.1 |
| 4 | | 355 | 54 | 60 | 1.6 | 2.5 |
| 5 | CATII(HM) | 355 | 54 | 60 | 1.6 | 2.9 |
| 6 | | 345 | 54 | 60 | 1.6 | 1.5 |
| 7 | CATIII | 355 | 54 | 60 | 1.6 | 18.9 |
| 8 | | 345 | 54 | 60 | 1.6 | 8.4 |
| | | CII feedstock | | | | |
| 9 | CATI(LM) | 345 | 54 | 40.8 | 1.8 | 31.8 |
| 10 | | 355 | 54 | 40.8 | 1.8 | 6.2 |
| 11 | | 365 | 54 | 40.8 | 1.8 | 61.0 |
| 12 | CATII(HM) | 345 | 54 | 40.8 | 1.8 | 36.9 |
| 13 | | 355 | 54 | 40.8 | 1.8 | 3.6 |
| 14 | | 365 | 54 | 40.8 | 1.8 | 2.1 |
| 16 | CATIII | 345 | 54 | 40.8 | 1.8 | 29.6 |
| 17 | | 355 | 54 | 40.8 | 1.8 | 9.3 |
| 18 | | 365 | 54 | 40.8 | 1.8 | 3.0 |
| | | CIII feedstock | | | | |
| 19 | CATI(LM) | 345 | 54 | 60 | 1.6 | 15.9 |
| 20 | | 355 | 54 | 60 | 1.6 | 2.9 |
| 21 | | 365 | 54 | 60 | 1.6 | 0.9 |
| 22 | CATII(HM) | 345 | 54 | 60 | 1.6 | 7.2 |
| 23 | | 355 | 54 | 60 | 1.6 | 2.7 |
| 24 | | 365 | 54 | 60 | 1.6 | 1.6 |
| 25 | CATIII | 345 | 54 | 60 | 1.6 | 14.4 |
| 26 | | 355 | 54 | 60 | 1.6 | 4.5 |
| 27 | | 365 | 54 | 60 | 1.6 | 3.2 |
| | | CIV feedstock | | | | |
| 28 | CATI(LM) | 345 | 54 | 60 | 1.6 | 34.3 |
| 29 | | 355 | 54 | 60 | 1.6 | 7.7 |
| 30 | | 365 | 54 | 60 | 1.6 | 1.5 |
| 31 | CATII(HM) | 345 | 54 | 60 | 1.6 | 8.4 |

TABLE 3-continued

Catalytic activity after applying the improved activation and start-up procedures in the deep HDS for producing ULSD

| Tests | Catalyst | Temperature (° C.) | Pressure (kg/cm²) | H₂/oil ratio (m³/bbl) | LHSV (h⁻¹) | S (wppm) |
|---|---|---|---|---|---|---|
| 32 | | 355 | 54 | 60 | 1.6 | 4.3 |
| 33 | | 365 | 54 | 60 | 1.6 | 1.1 |

EXAMPLES

What follows is the description of four practical examples to better understand the present invention without this limiting its scope.

Example 1

Figure 1:
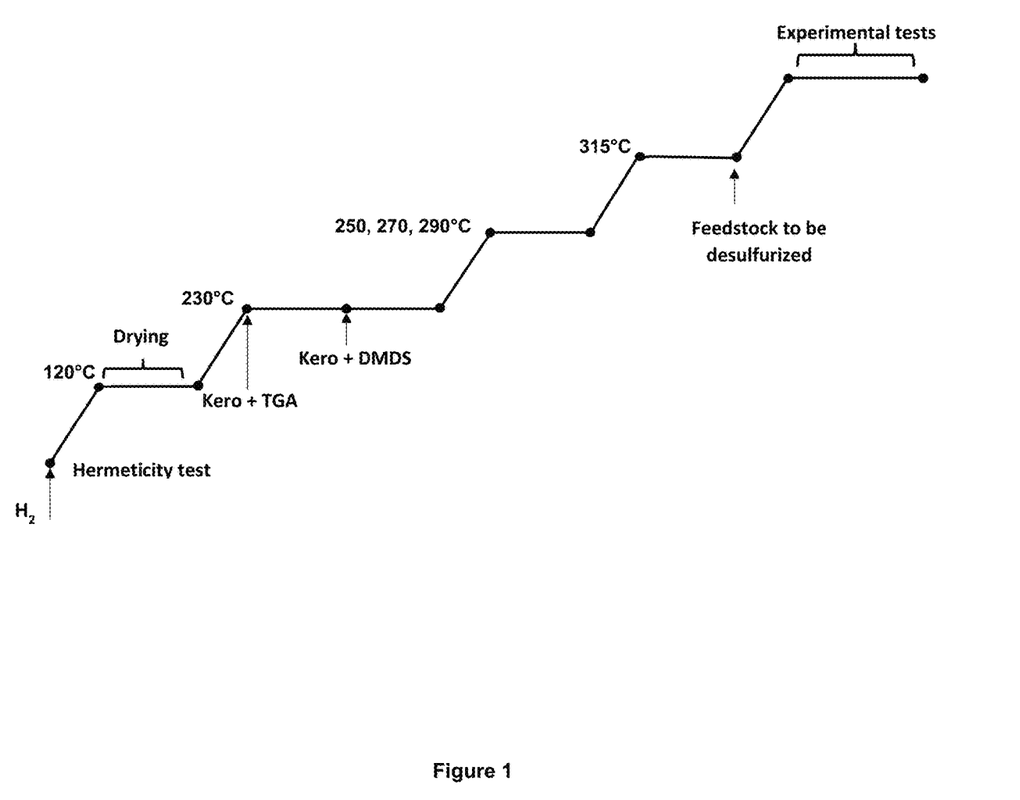
FIG. 1 shows a diagram of the activation and start-up procedures of the catalysts for the deep hydrodesulfurization of middle distillates.
Figure 2:
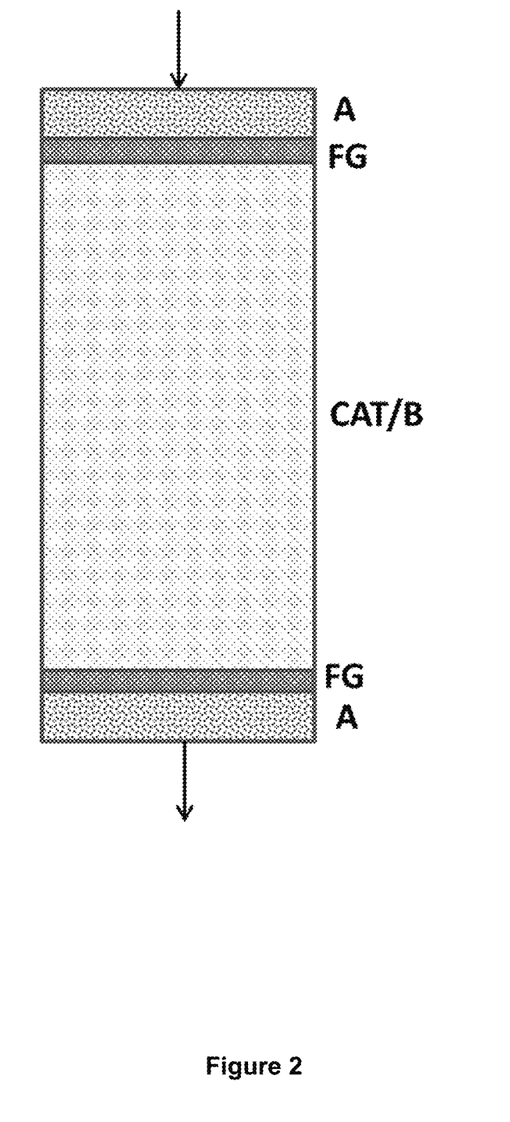
FIG. 2 displays the reactor employed in the pilot plant tests and the distribution of catalysts and inert materials, where: A=inert material, FG=fiberglass, CAT/B=catalyst/combined bed.

Experimental runs were carried out in a pilot plant employing a continuous flow, combined bed reactor with the corresponding hermeticity tests, obtaining the following results:

1.—Load 75 mL of CATII(HM) catalyst and 75 mL of inert A, compacting uniformly as indicated in the reactor diagram (see FIG. 2) with the locations of the catalytic bed and inert A.
2.—Adjust the operating pressure at 54 kg/cm² with $H_2$ flow rate of 75 L/h. Start heating up to 120° C. at a heating rate of 20° C./h; once these conditions are reached, they are kept for 2 h.
3.—Increase the reactor temperature to 230° C. at a heating rate of 20° C./h. At 230° C., start adding Kero/TGA at 180 mL/h (density at 20° C.=0.8292 g/mL), keeping the pressure at 54 kg/cm², adjusting the $H_2$ flow rate at 40 L/h and keeping these conditions for 6 h.
4.—Stop the Kero/TGA blend. At 230° C., feed 155 mL/h of Kero/DMDS (density at 20° C.=0.8292 g/m L), keeping the pressure at 54 kg/cm² and $H_2$ flow rate at 40 L/h for 2 h.
5.—Increase the reactor temperature to 250° C. at a heating rate of 20° C./h, pressure of 54 kg/cm², 40 L/h of $H_2$ and 155 mL/h of Kero/DMDS, keeping these conditions for 2 h.
6.—Increase the reactor temperature to 270° C. at a heating rate of 20° C./h, pressure of 54 kg/cm², 40 L/h of $H_2$ and 155 mL/h of Kero/DMDS, keeping these conditions for 2 h.
7.—Increase the reactor temperature to 290° C. at a heating rate of 20° C./h, pressure of 54 kg/cm², 40 L/h of $H_2$ and 155 mL/h of Kero/DMDS, keeping these conditions for 2 h.
8.—Increase the reactor temperature to 315° C. at a heating rate of 20° C./h, pressure of 54 kg/cm², $H_2$ flow rate of 40 L/h and Kero/DMDS flow rate of 155 m L/h, keeping these conditions for 2 h.
9.—Stop feeding Kero/DMDS and feed 155 mL/h of kerosene (density at 20° C.=0.8240 g/mL) at 315° C., pressure of 54 kg/cm² and 40 L/h of $H_2$. Perform 6 balances of 8 h each. At the end of each balance, recover 750 mL of product and wash it with a NaOH solution at 10 wt. % with a volume ratio of 1:1 for 30 min. Recover the "washed product" and the "remaining product". Label the samples (8 samples).
10.—Catalytic evaluation: once the 8 balances are finished, stop feeding kerosene and feed the process feedstock identified as CII, proceeding as follows:
Feed 135 mL/h of CII (density at 20° C.=0.8243 g/mL), (LHSV=1.8 h⁻¹)
Increase the temperature to 365° C. at a heating rate of 5° C./h
Keep the pressure at 54 kg/cm²
Adjust the $H_2$ flow rate at 40.8 L/h
Under these conditions, stabilize the reactor for 8 h
11.—Perform 4 balances of 8 h under the following conditions:
Temperature at 365° C.
Pressure of 54 kg/cm²
135 mL/h of CII (LHSV=1.8 h⁻¹)
$H_2$ flow rate of 40.8 L/h
12.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 2.1 wppm of sulfur.

13.—After finishing the last 4 balances, stop feeding the CII feedstock and feed the CIV feedstock and perform the following changes:
Feed 180 mL/h of CIV (density at 20° C.=0.8603 g/m L), (LHSV=1.6 h⁻¹)
Increase the reactor temperature to 355° C. at a heating rate of 5° C./h
Adjust the pressure to 54 kg/cm²
Adjust the $H_2$ flow rate to 60 L/h
Under these conditions, stabilize the reactor for 8 h.
14.—Under previously established conditions, carry out 4 balances of 8 h.
15.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CIV feedstock considering 4 balances is in the order of 4.3 wppm of sulfur.

Example 2

1.—The loading conditions of the CATI (LM) catalyst and inert A are the same as those in Example 1.
2.—The Kero/TGA flow and temperature, pressure, $H_2$ flow and times are the same as those in Example 1.
3.—The Kero/DMDS flow and temperature, pressure, $H_2$ flow and times are the same as those in Example 1.
4. In the case of the Kero stabilization, the procedure, conditions, time and analysis to be done are the same as those in Example 1.
5.—In the case of the catalytic evaluation, the CI process feedstock is fed as follows:
Adjust the initial pressure in the reactor
Feed 115 mL/h of CI until flooding the catalytic bed
Increase the reactor pressure to 54 kg/cm²
Keep these conditions for 1 h
Stop feeding CI and keep the conditions for 1 h
Start feeding 112 mL/h of CI and $H_2$ at 29 L/h
Increase the reactor temperature to 315° C. at a heating rate of 30° C./h.
Start feeding CI at 135 mL/h (LHSV=1.6 h⁻¹) with pressure at 54 kg/cm² and $H_2$ flow of 60 L/h.

Increase the temperature reactor to 335° C. at 5° C./h, keeping a flow rate of 135 m L/h, pressure of 54 kg/cm² and H₂ flow of 60 L/h.

Catalytic evaluation of the catalyst CATI (LM)

5.—Increase to 345° C. the reactor temperature at a heating rate of 5° C./h and stabilize for 8 h.
6.—Perform 4 balances of 8 h each under the previous conditions.
7.—Increase the reactor temperature to 355° C. at a heating rate of 5° C./h and stabilize for 8 h.
8.—Carry out 4 balances of 8 h each under the previous conditions.
9.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 2.1 wppm of sulfur.

Example 3

1.—Load 75 mL of CATIII catalyst and 75 mL of inert A, compacting uniformly as indicated in the reactor diagram (see FIG. 2) with the location and length of the catalytic bed and location and amount of inert A.
2.—Adjust the operating pressure at 54 kg/cm² with H₂ flow rate of 75 L/h. Start heating up to 120° C. at a heating rate of 20° C./h; once these conditions are reached, they are kept for 2 h.
3.—Increase the reactor temperature to 230° C. at a heating rate of 20° C./h. At 230° C., start adding Kero/TGA at 180 mL/h (density at 20° C.=0.8292 g/mL), keeping the pressure at 54 kg/cm² and the H₂ flow rate at 67.9 L/h for 10 h.
4.—Stop the Kero/TGA blend. At 230° C., feed 180 mL/h of Kero/DMDS (density at 20° C.=0.8292 g/mL), keeping the pressure at 54 kg/cm² and H₂ flow rate at 67.9 L/h. Keep the conditions for 16 h.
5.—During the last hour of the 16-h period, recover the "sulfhydration product" sample and establish the sulfur content. Likewise, recover the "outlet gas" sample and establish H₂S content. Label the samples.
6.—Increase the reactor temperature to 250° C. at a heating rate of 20° C./h, pressure of 54 kg/cm², 67.9 L/h of H₂ and 180 mL/h of Kero/DMDS, keeping these conditions for 8 h.
7.—During the last hour of the 8-h period, recover the "sulfhydration product" sample and establish the sulfur content. Likewise, recover the "outlet gas" sample and establish H₂S content. Label the samples.
8.—Increase the reactor temperature to 290° C. at a heating rate of 20° C./h, pressure of 54 kg/cm², H₂ flow rate of 67.9 L/h and Kero/DMDS flow rate of 180 mL/h, keeping these conditions for 8 h.
9.—During the last hour of the 8-h period, recover the "sulfhydration product" sample and establish the sulfur content. Likewise, recover the "outlet gas" sample and establish H₂S content. Label the samples.
10.—Increase the reactor temperature to 315° C. at a heating rate of 20° C./h, pressure of 54 kg/cm², H₂ flow rate of 67.9 L/h and Kero/DMDS flow rate of 180 mL/h, keeping these conditions for 8 h.
11.—During the last hour of the 8-h period, recover the "sulfhydration product" sample and establish the sulfur content. Likewise, recover the "outlet gas" sample and establish H₂S content. Label the samples.
12.—Stop feeding the Kero/DMDS blend and feed 155 mL/h of kerosene at 315° C., pressure of 54 kg/cm² and 67.9 L/h of H₂. Perform 6 balances of 8 h each. At the end of each balance, recover 750 mL of product and wash it with a NaOH solution at 10 wt. % with a volume ratio of 1:1 for 30 min.
13.—Increase the reactor temperature to 345° C. at a heating rate of 5° C./h and feed 180 mL/h of "feedstock to be stabilize" (Kero), keeping the pressure at 54 kg/cm² and the H₂ flow at 69.7 L/h.
14.—Catalytic evaluation: at 355° C. as reactor temperature, stop feeding the "feedstock to be stabilized" (Kero) and feed the CIII process feedstock as follows:
Feed 120 mL/h of CI (density at 20° C.=0.8203 g/mL), (LHSV=1.6 h⁻¹)
Keep the pressure at 54 kg/cm²
Adjust the H₂ flow at 60 L/h
Under these conditions, stabilize the conditions for 8 h.
15.—Perform 4 balances of 8 h each under the following conditions:
Temperature at 355° C.
Pressure at 54 kg/cm²
Flow of CIII at 120 mL/h
Flow of H₂ at 45.3 L/h
16.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 4.5 wppm of sulfur.

17.—After finishing the last 4 balances, continue feeding the CIII feedstock at 120 mL/h under the same pressure and H₂ flow conditions and increase the reactor temperature to 365° C. at a heating rate of 5° C./h. stabilize these conditions for 8 h and perform 4 balances under these conditions.
18.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 3.2 wppm of sulfur.

Example 4

1.—Load 75 mL of CATI(HM) catalyst and 75 mL of inert A, compacting uniformly as indicated in the reactor diagram (see Figure) with the location of the catalytic bed and location and amount of inert A.
2.—Adjust the operating pressure at 54 kg/cm² with H₂ flow rate of 75 L/h. Start heating up to 120° C. at a heating rate of 20° C./h; once these conditions are reached, they are kept for 2 h.
3.—Increase the reactor temperature to 230° C. at a heating rate of 20° C./h. Start adding Kero/TGA at 180 mL/h (density at 20° C.=0.8292 g/mL), keeping the pressure at 54 kg/cm² and adjusting the H₂ flow rate at 75 L/h.
4.—Stop the Kero/TGA blend. At 230° C., feed 180 mL/h of Kero/DMDS (density at 20° C.=0.8292 g/mL), keeping the pressure at 54 kg/cm² and H₂ flow rate at 67.9 L/h. Keep the conditions for 2 h.
5.—During the last hour of the 2 h period, recover the "sulfhydration product" sample and establish the sulfur content. Likewise, recover the "outlet gas" sample and establish H₂S content. Label the samples.
6.—Increase the reactor temperature to 250° C. at a heating rate of 20° C./h, pressure at 54 kg/cm², H₂ flow at 69.7 L/h and 180 mL/h of Kero/DMDS blend. Keep these conditions for 2 h.
7.—During the last hour of the 2 h period, recover the "sulfhydration product" sample and establish the sulfur content. Likewise, recover the "outlet gas" sample and establish H₂S content. Label the samples.
8.—Increase the reactor temperature to 270° C. at a heating rate of 20° C./h, pressure of 54 kg/cm², H₂ flow rate of 67.9 L/h and Kero/DMDS flow rate of 180 mL/h, keeping these conditions for 2 h.
9.—During the last hour of the 2 h period, recover the "sulfhydration product" sample and establish the sulfur content. Likewise, recover the "outlet gas" sample and establish H₂S content. Label the samples.
10.—Increase the reactor temperature to 290° C. at a heating rate of 20° C./h, pressure of 54 kg/cm², H₂ flow rate of 67.9 L/h and Kero/DMDS flow rate of 180 mL/h, keeping these conditions for 2 h.
11.—During the last hour of the 2 h period, recover the "sulfhydration product" sample and establish the sulfur content. Likewise, recover the "outlet gas" sample and establish H₂S content. Label the samples.
12.—Increase the reactor temperature to 315° C. at a heating rate of 20° C./h, pressure of 54 kg/cm², H₂ flow rate of 67.9 L/h and Kero/DMDS flow rate of 180 mL/h, keeping these conditions for 2 h.
13.—During the last hour of the 2 h period, recover the "sulfhydration product" sample and establish the sulfur content. Likewise, recover the "outlet gas" sample and establish H₂S content. Label the samples.
14.—Stop feeding the Kero/DMDS blend and feed 180 mL/h of kerosene (density at 20° C.=0.8240 g/mL) at 315° C., pressure of 54 kg/cm² and 67.9 L/h of H₂. Perform 6 balances of 8 h each. At the end of each balance, recover 750 mL of product and wash it with a NaOH solution at 10 wt. % with a volume ratio of 1:1 for 30 min. Recover the "washed product" and the "remaining product". Label the samples (8 samples).
15.—Increase the reactor temperature to 345° C. at a heating rate of 5° C./h, pressure at 54 kg/cm², H₂ flow at 67.97 L/h and 180 mL/h of "feedstock to be stabilized" (Kero) (p.e.$_{20/4°\ C.}$=0.8240).
16.—Catalytic evaluation: stop feeding the "feedstock to be stabilized" (Kero) and feed the CIV process feedstock as follows:
Feed 120 mL/h of CIV (density at 20° C.=0.8203 g/mL), (LHSV=1.6 h⁻¹)
Increase the reactor temperature to 355° C. at a heating rate of 5° C./h
Keep pressure at 54 kg/cm²
Adjust the H₂ flow at 60 L/h
Under these conditions, stabilize for 8 h
17.—Perform 4 balances of 8 h each
18.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 4.3 wppm of sulfur.
19.—At the end of the 4 last balances, continue feeding the feedstock CIV and perform the following changes:
Feed 120 mL/h of CI (density at 20° C.=0.8203 g/mL), (LHSV 1.6 h⁻¹)
Increase the reactor temperature to 365° C. at a heating rate of 5° C./h
Keep the pressure at 54 kg/cm²
Adjust the H₂ flow at 60 L/h
Under these conditions, stabilize for 8 h.
20.—Carry out 4 balances of 8 h each
21.—At the end of the 4 balances, recover 750 mL of product and wash it with a NaOH solution at 10 wt. % with a volume ratio of 1:1 for 30 min. Recover the washed and non-washed product. Label the samples (4 balances).

The average activity of the deep HDS of the CII feedstock considering 4 balances is in the order of 1.1 wppm of sulfur.

The invention claimed is:

1. A method for the activation and start-up of catalysts for the deep hydrodesulfurization (HDS) of middle distillates, which comprises the following stages: two activation stages: stage 1, where thioglycolic acid (TGA) is applied, and stage 2, where dimethyl disulfide (DMDS) is applied; a catalyst stabilization stage, where the catalyst is stabilized; and a catalytic evaluation stage, where the activity of the catalyst is evaluated.

2. The method according to claim 1, wherein at stages 1 and 2, kerosene is used to transport TGA and DMDS.

3. The method according to claim 1, wherein at stages 1 and 2, hydrogen is fed.

4. The method according to claim 1, wherein at stage 1, the reactor temperature ranges from 200 to 230° C.

5. The method according to claim 1, wherein at stage 1, pressure ranges from 45 to 60 kg/cm².

6. The method according to claim 1, wherein at stage 1, the Kero/TGA flow rate ranges from 170 to 190 mL/h.

7. The method according to claim 1, wherein at stage 1, the H₂/oil ratio ranges from 50 to 60 m³/bbl.

8. The method according to claim 1, wherein at stage 1, time ranges from 4 to 10 h.

9. The method according to claim 1, wherein at stage 2, the temperature ranges from 200-320° C. in a staggered manner.

10. The method according to claim 1, wherein at stage 2, pressure ranges from 45 to 60 kg/cm².

11. The method according to claim 1, wherein at stage 2, the Kero/DMDS ranges from 170 to 190 mL/h.

12. The method according to claim 1, wherein at stage 2, the H₂/oil ratio ranges from 50 to 60 m³/bbl.

13. The method according to claim 1, wherein at stage 2, the time ranges from 8 to 16 h.

14. The method according to claim 1, wherein at the catalyst stabilization stage, the reactor temperature ranges from 300 to 320° C.

15. The method according to claim 1, wherein at the catalyst stabilization stage, the pressure ranges from 45 to 60 kg/cm².

16. The method according to claim 1, wherein at the catalyst stabilization stage, the feedstock flow rate ranges from 170 to 190 mL/h.

17. The method according to claim 1, wherein at the catalyst stabilization stage, feedstocks within the interval of middle distillates can be used.

18. The method according to claim 1, wherein at the catalyst stabilization stage, the H₂/oil ratio ranges from 50 to 60 m³/bbl.

19. The method according to claim 1, wherein at the catalyst stabilization stage, the time ranges from 48 to 72 h.

20. The method according to claim 1, wherein the catalytic evaluation stage comprises activity tests performed under operating conditions effective to evaluate the activity of each catalyst with every feedstock in terms of the deep HDS of middle distillates for producing ultra low sulfur diesel (ULSD), wherein the operating conditions comprise temperature, pressure conditions, liquid hourly space velocity (LHSV), and $H_2$/oil ratio.

21. The method according to claim 20, the temperature ranges from 335 to 355° C.

22. The method according to claim 20, wherein the pressure ranges from 45 to 60 kg/cm$^2$.

23. The method according to claim 20, wherein the LHSV ranges from 1.0 to 2.5 h$^{-1}$.

24. The method according to claim 20, wherein the $H_2$/oil ratio ranges from 50 to 60 m$^3$/bbl.

25. The method according to claim 1, further comprising selecting operating conditions of the two activation stages, the catalyst stabilization stage, and the catalytic evaluation stage for each feedstock type and catalyst.

\* \* \* \* \*